Figure 1:
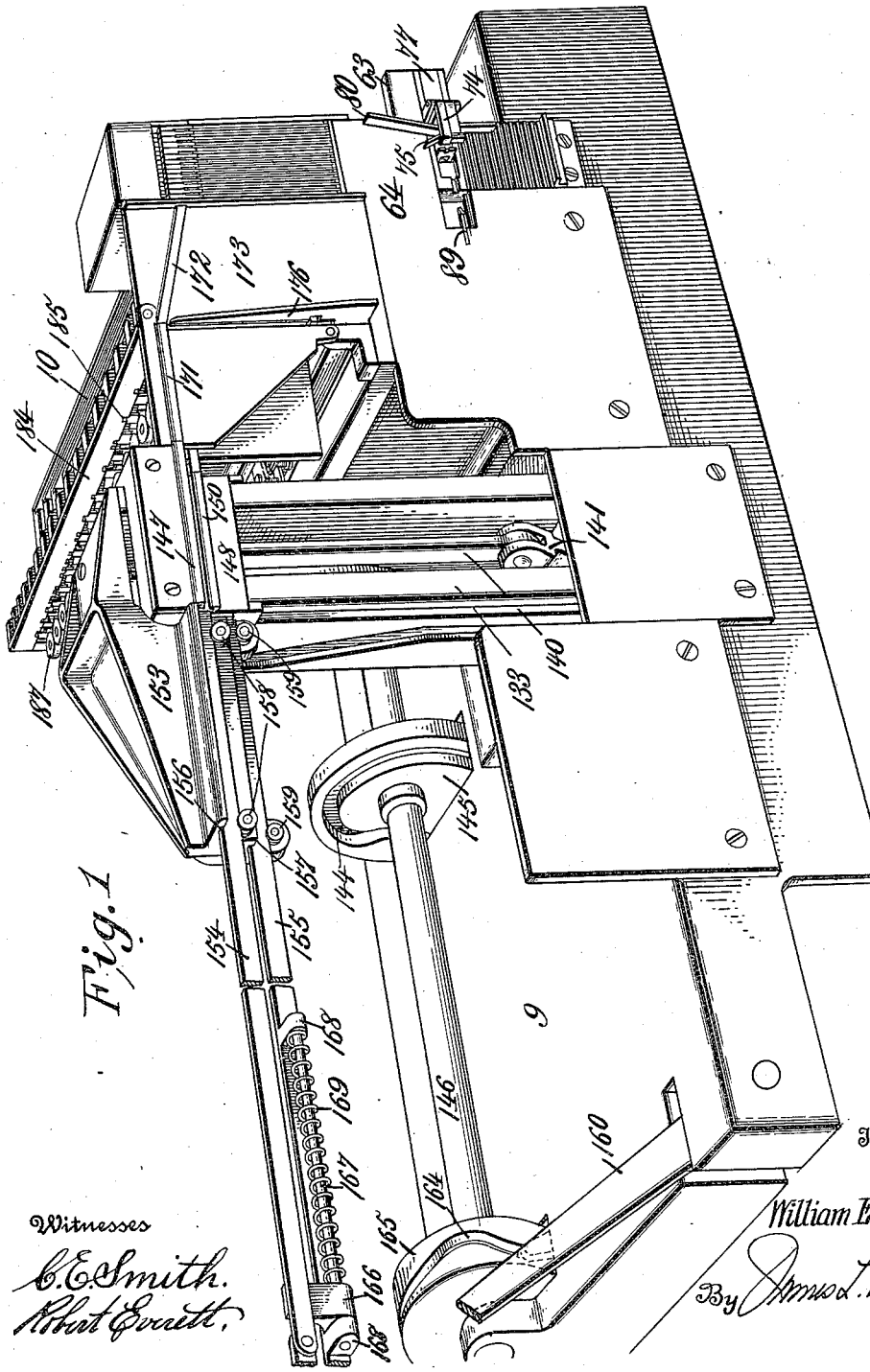

W. E. BERTRAM.
MONOLINE COMPOSING MACHINE.
APPLICATION FILED MAY 13, 1910.

997,736.

Patented July 11, 1911.
14 SHEETS—SHEET 1.

Witnesses
C. E. Smith.
Robert Everett.

Inventor
William E. Bertram.
By James L. Norris Jr.
Attorney

W. E. BERTRAM.
MONOLINE COMPOSING MACHINE.
APPLICATION FILED MAY 13, 1910.

997,736.

Patented July 11, 1911.
14 SHEETS—SHEET 3.

Witnesses
C. E. Smith.
Robert Everett.

Inventor
William E. Bertram
By
James L. Norris
Attorney

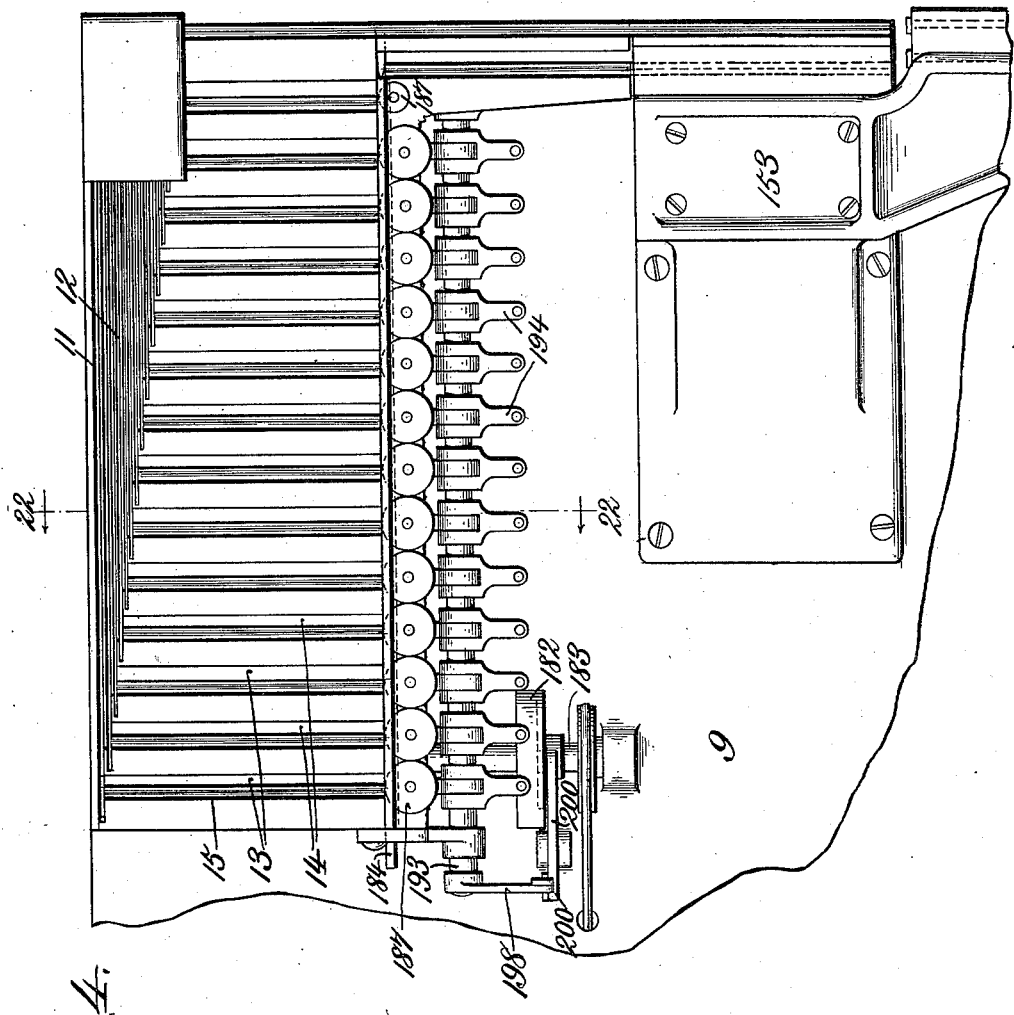

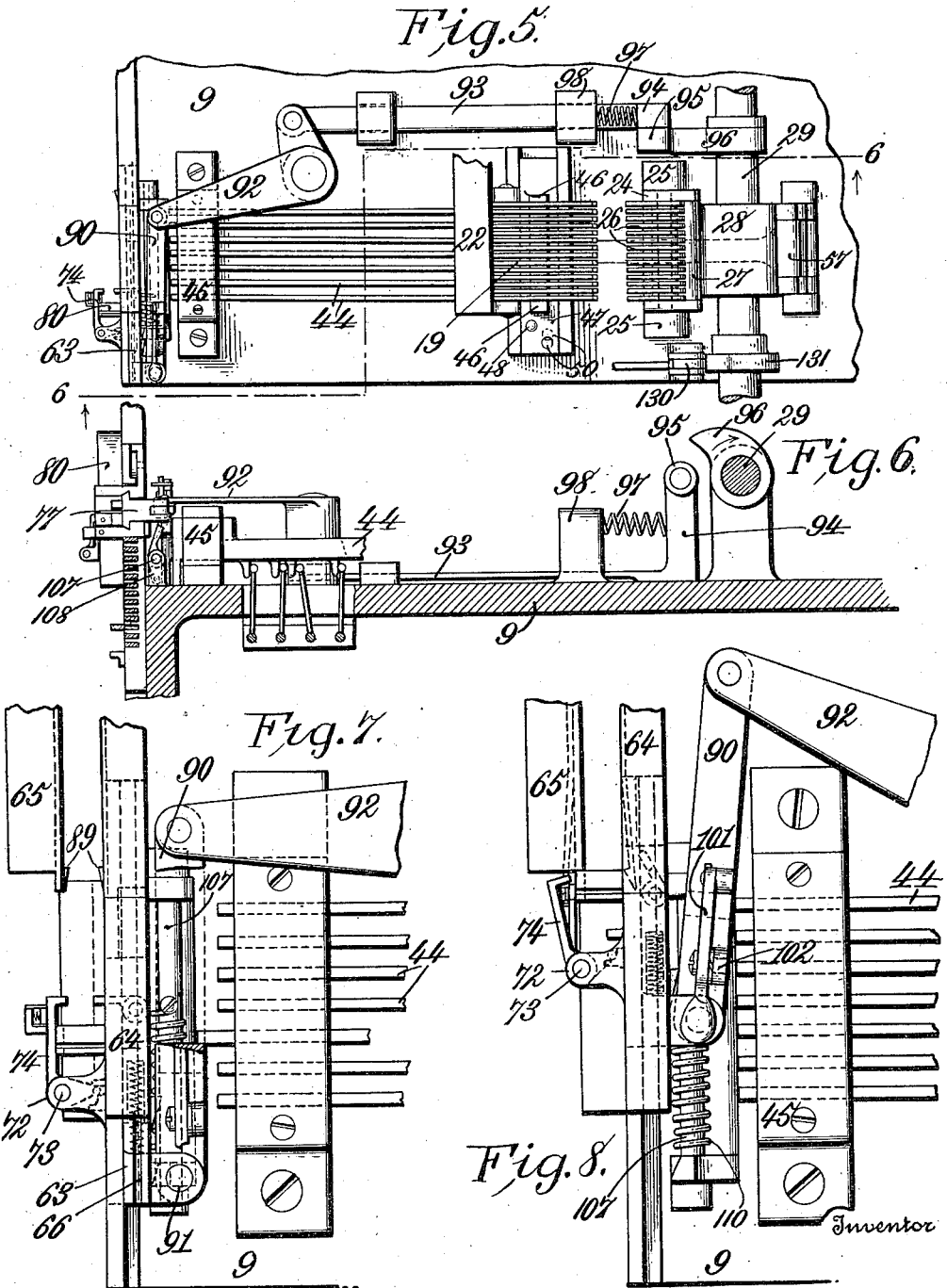

W. E. BERTRAM.
MONOLINE COMPOSING MACHINE.
APPLICATION FILED MAY 13, 1910.

997,736.

Patented July 11, 1911.
14 SHEETS—SHEET 6.

Witnesses
C. E. Smith.
Robert Everett.

Inventor
William E. Bertram,
By James L. Morris,
Attorney

W. E. BERTRAM.
MONOLINE COMPOSING MACHINE.
APPLICATION FILED MAY 13, 1910.
997,736.
Patented July 11, 1911.
14 SHEETS—SHEET 7.
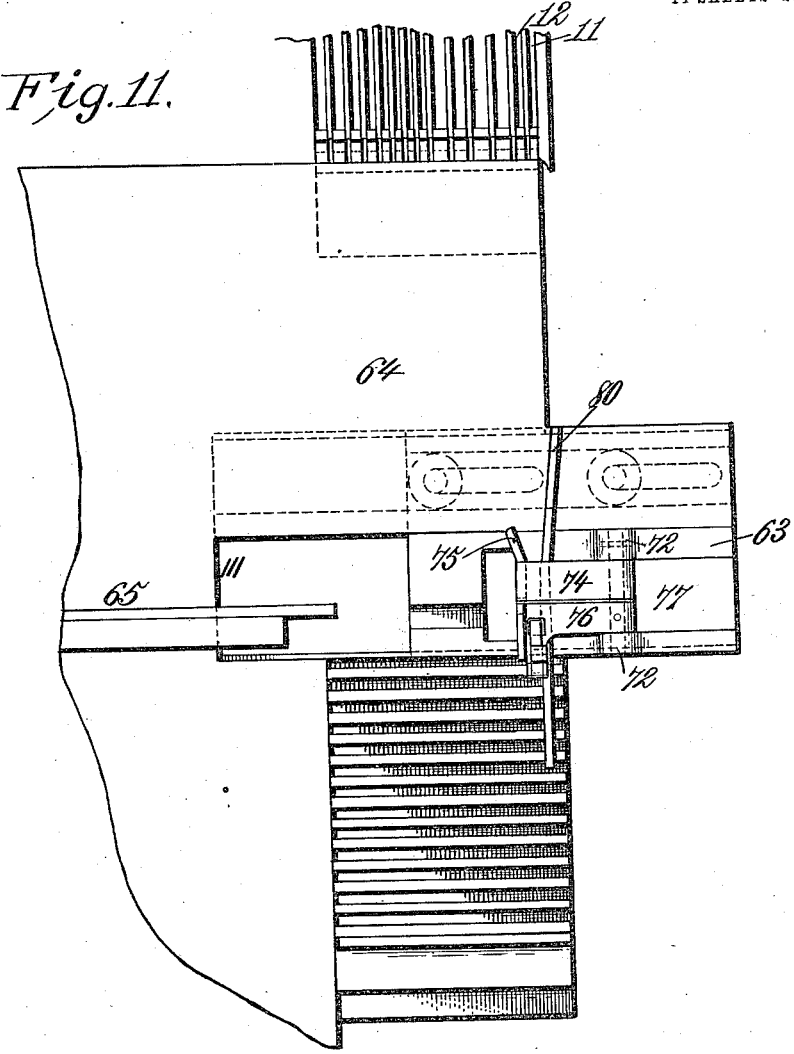
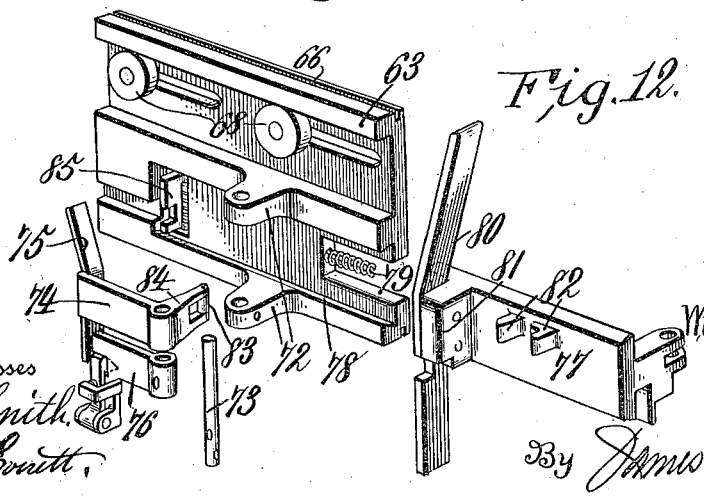
Witnesses
Inventor
William E. Bertram,
By
Attorney

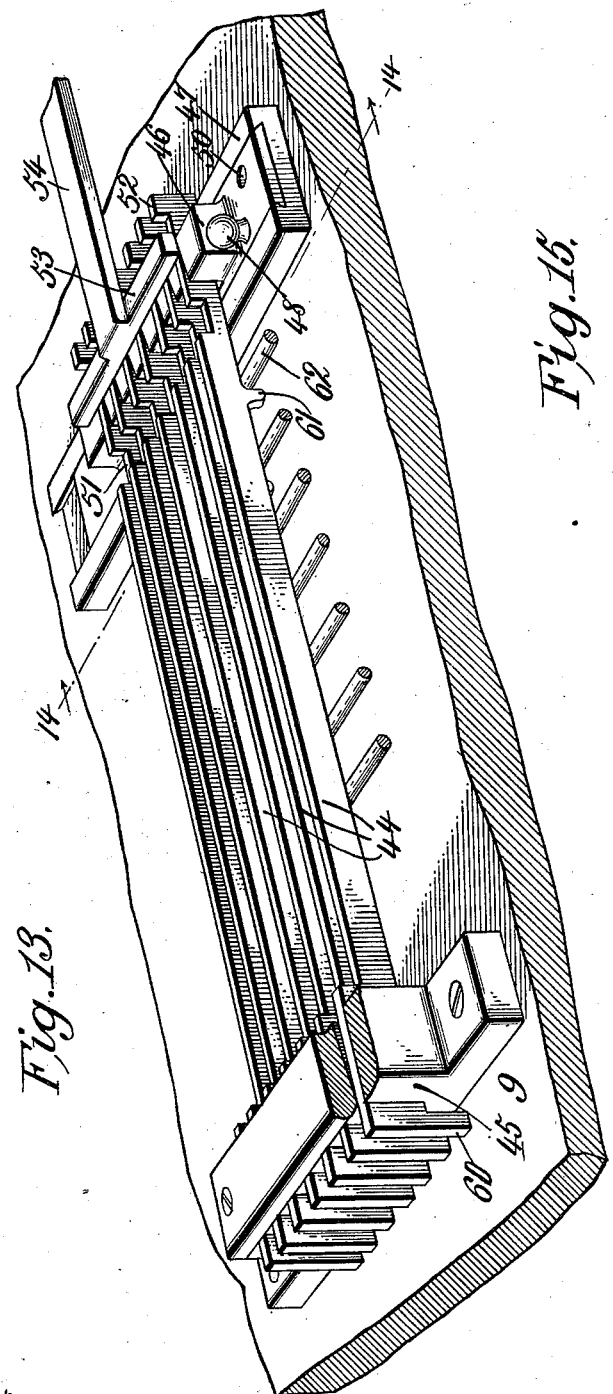
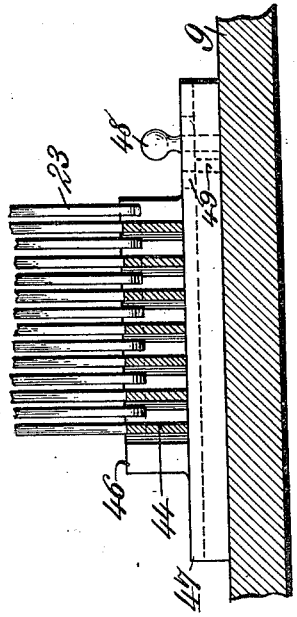
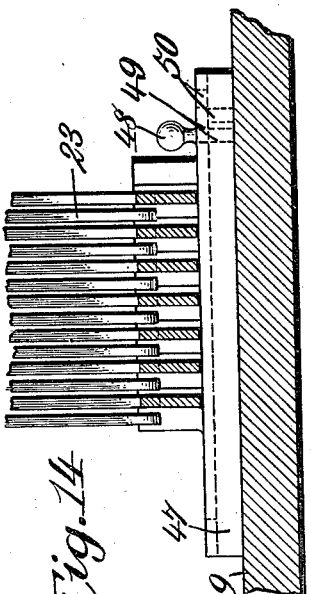

W. E. BERTRAM.
MONOLINE COMPOSING MACHINE.
APPLICATION FILED MAY 13, 1910.

997,736.

Patented July 11, 1911.
14 SHEETS—SHEET 9.

Inventor
William E. Bertram.

Witnesses
C. E. Smith.
Robert Everett.

By James L. Norris
Attorney

W. E. BERTRAM.
MONOLINE COMPOSING MACHINE.
APPLICATION FILED MAY 13, 1910.

997,736.

Patented July 11, 1911.

14 SHEETS—SHEET 11.

Witnesses
C. E. Smith.
Robert Everett,

Inventor
William E. Bertram.
By James L. Norris, Jr.
Attorney

W. E. BERTRAM.
MONOLINE COMPOSING MACHINE.
APPLICATION FILED MAY 13, 1910.
997,736.
Patented July 11, 1911.
14 SHEETS—SHEET 12.
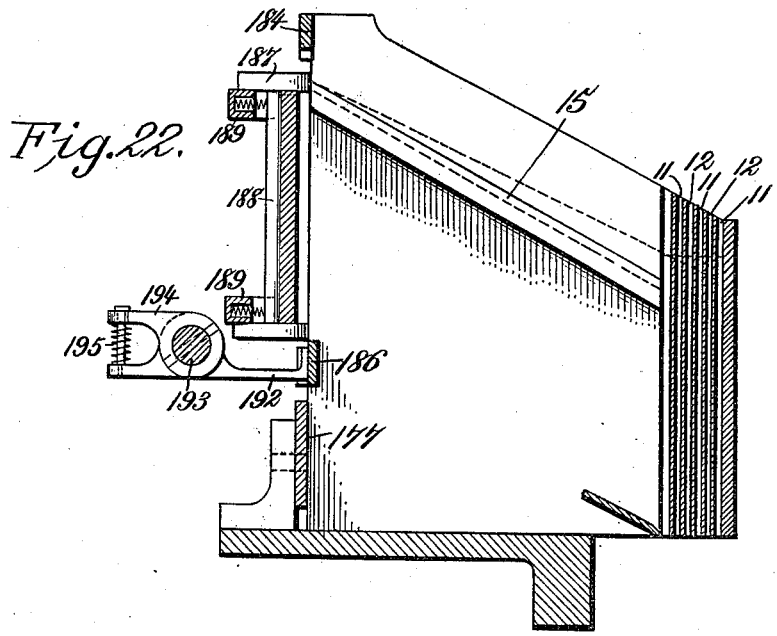
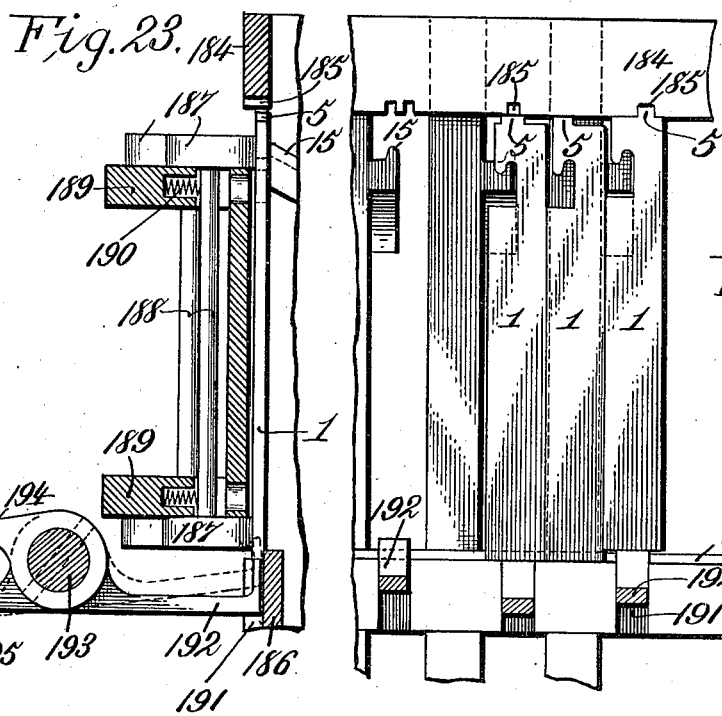
Witnesses
C. E. Smith.
Robert Everitt.
Inventor
William E. Bertram.
By James L. Norris
Attorney

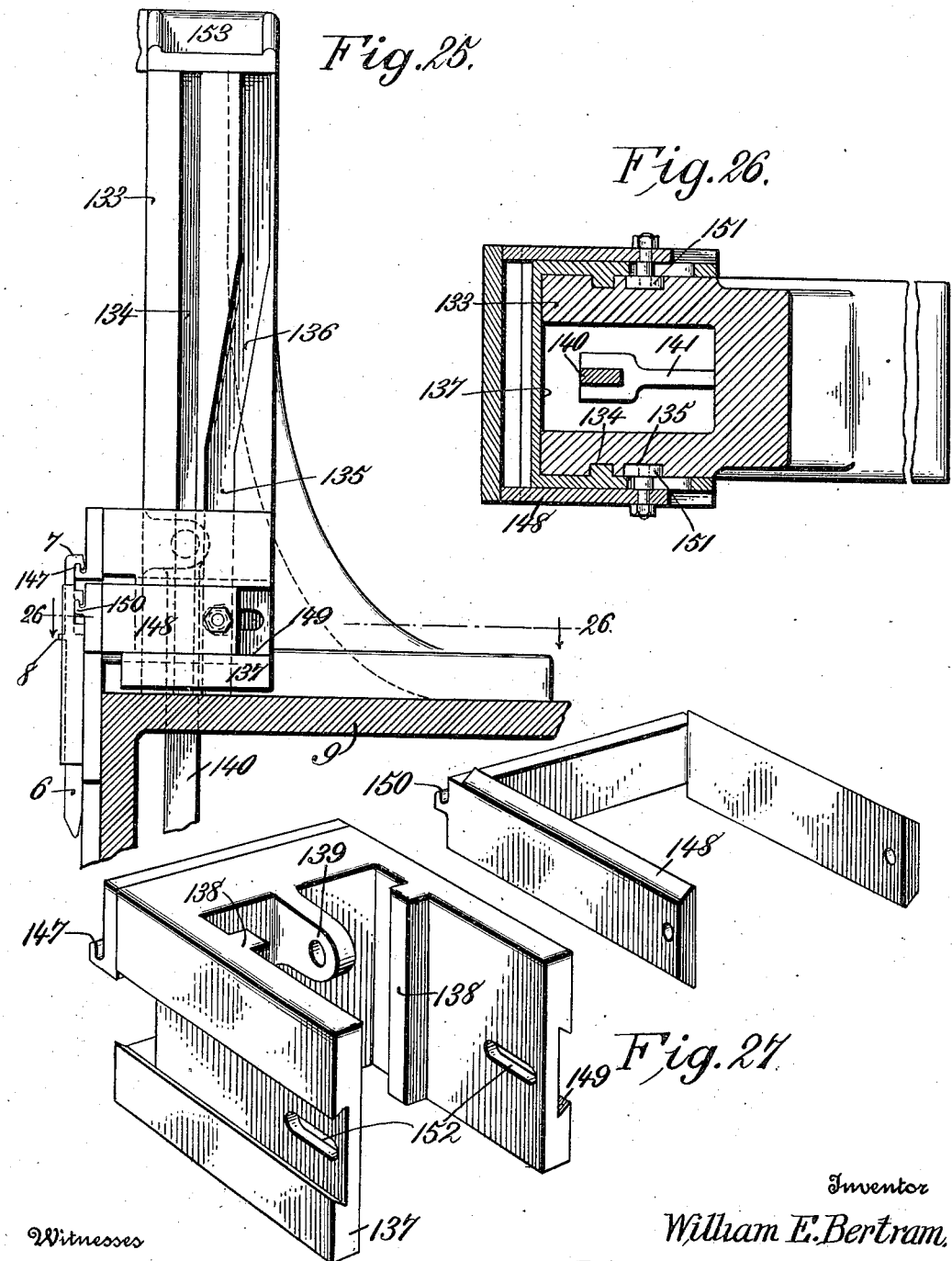

W. E. BERTRAM.
MONOLINE COMPOSING MACHINE.
APPLICATION FILED MAY 13, 1910.

997,736.

Patented July 11, 1911.
14 SHEETS—SHEET 14.

WITNESSES:
C. E. Smith.
Robert Everett.

INVENTOR
William E. Bertram.
BY
James L. Morris,
ATTORNEY.

UNITED STATES PATENT OFFICE.

WILLIAM ERNEST BERTRAM, OF BROOKLYN, NEW YORK, ASSIGNOR TO HERMAN RIDDER, OF NEW YORK, N. Y.

MONOLINE COMPOSING-MACHINE.

997,736.

Specification of Letters Patent. Patented July 11, 1911.

Application filed May 13, 1910. Serial No. 561,129.

*To all whom it may concern:*

Be it known that I, WILLIAM ERNEST BERTRAM, a citizen of the United States, residing at Brooklyn, in the county of Kings and State of New York, have invented new and useful Improvements in Monoline Composing-Machines, of which the following is a specification.

My present invention relates to improvements in monoline composing and line-casting machines of the type shown in U. S. Letters Patent, No. 506,198 granted to W. S. Scudder on October 3, 1893, and it has for its object primarily to provide a generally improved machine of the type above mentioned and also one which is capable of holding and operating with two or more fonts of matrices to the end that the machine may set up matter containing type of two or more styles or sizes without the necessity of interchanging magazines or disturbing other parts of the machine, the change from one font to the other being accomplished readily by the operator, and the matrix selecting and releasing mechanism for the different fonts being operable from a single or common keyboard.

Another object of the invention is to provide in a machine of this type a traveling composing box which is so mounted and controlled by the matrix selecting mechanism that the composing box will be positioned directly beneath each particular magazine channel from which the matrix is delivered, a further movement of the composing box serving to convey each matrix to the assembling point, the traveling composing box enabling the matrices to drop thereinto with a perpendicular fall and through a short distance, the height of the machine being thereby diminished and, moreover, greater speed in the composing is obtainable. To increase the rapidity in the operation of the machine, I also provide improved means for assisting the delivery of the matrices from the magazine.

Another object of the present invention is to provide an improved distributing mechanism for returning the matrices and spacers to the magazine channels and space box respectively, such mechanism being relatively simple in its construction and operating with certainty and rapidity.

A further object of the invention is to provide an improved construction for the matrix bars whereby the hooks for suspending all of the bars of a font will be of the same length and, moreover, the length of the hooks may be shortened, this feature enabling the dimensions of the machine to be reduced and also reducing the distance of travel of the matrix bars from the magazine channels to the composing box.

To these and other ends, the invention consists in certain improvements, and combinations and arrangements of parts, all as will be hereinafter more fully described, the novel features being pointed out particularly in the claims at the end of the specification.

Figure 2:
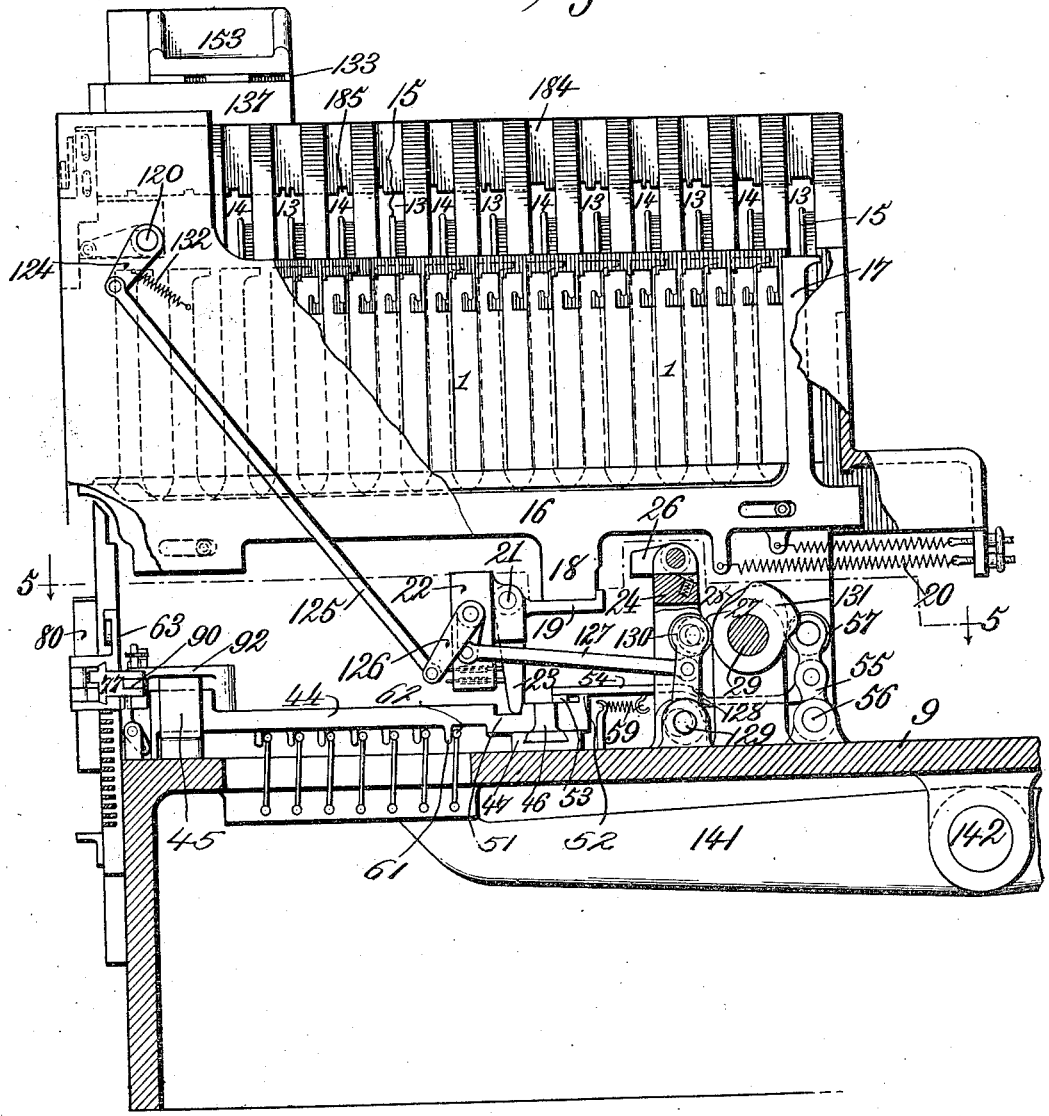
Figure 3:
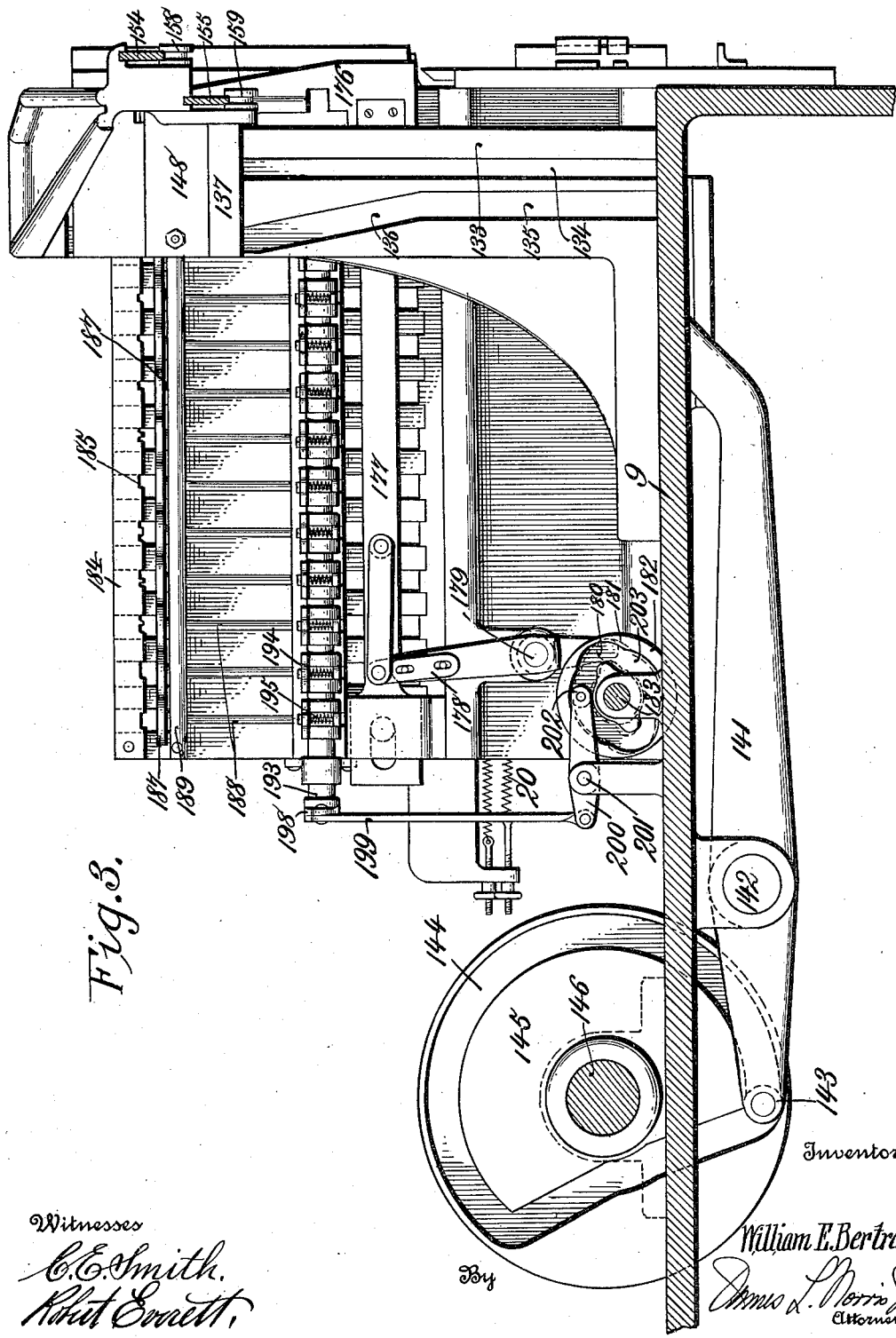
Figure 9:
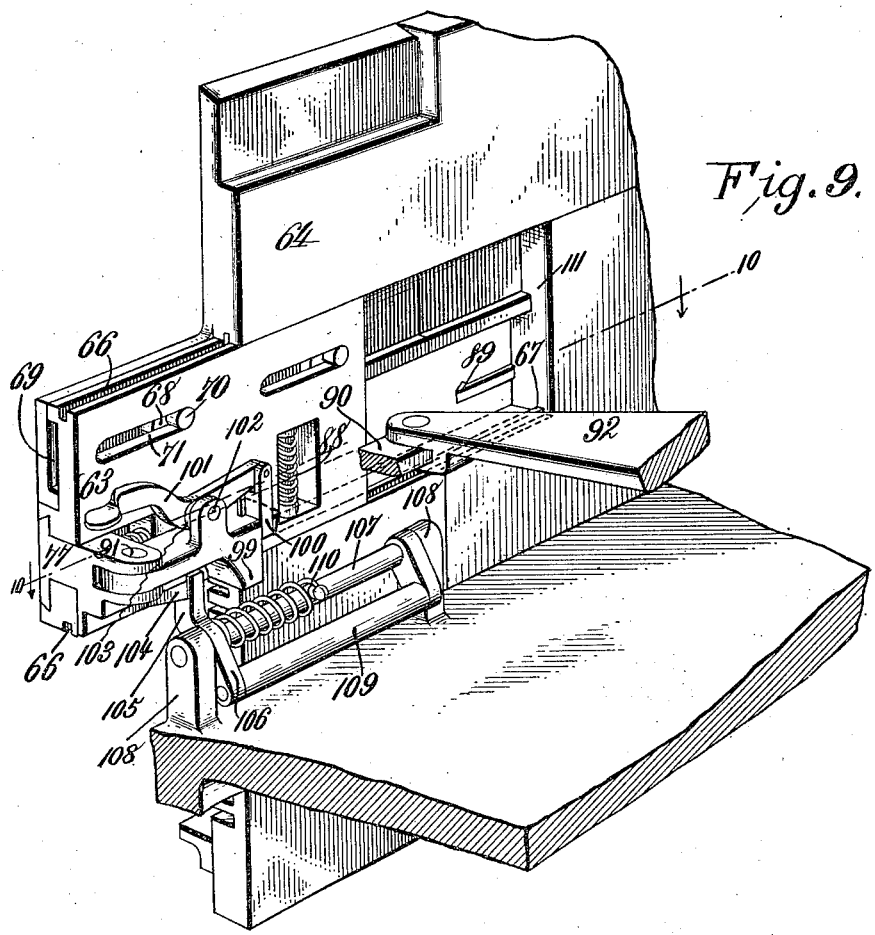
Figure 10:
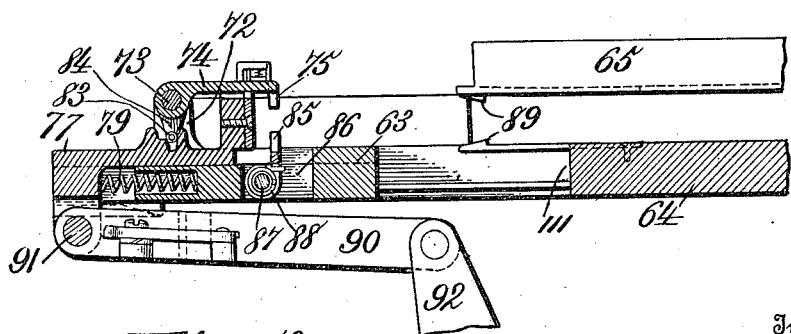
Figure 16:
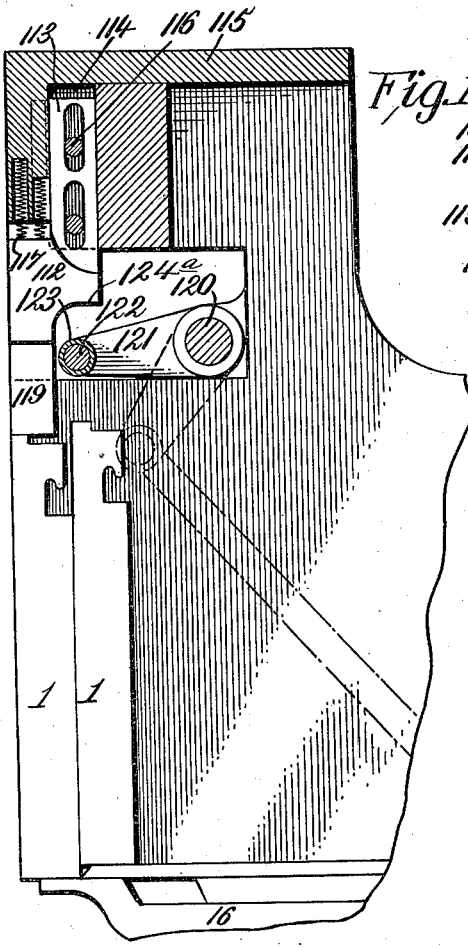
Figure 17:
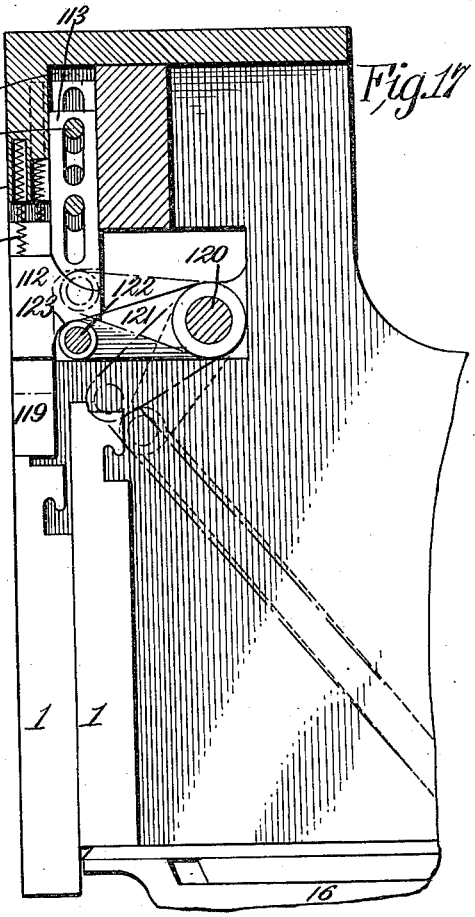
Figure 18:
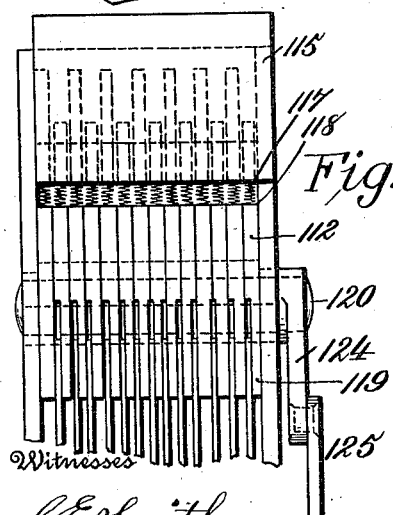
Figure 19:
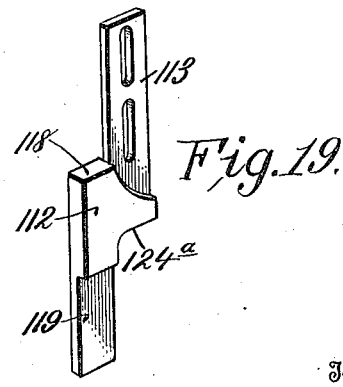
Figure 20:
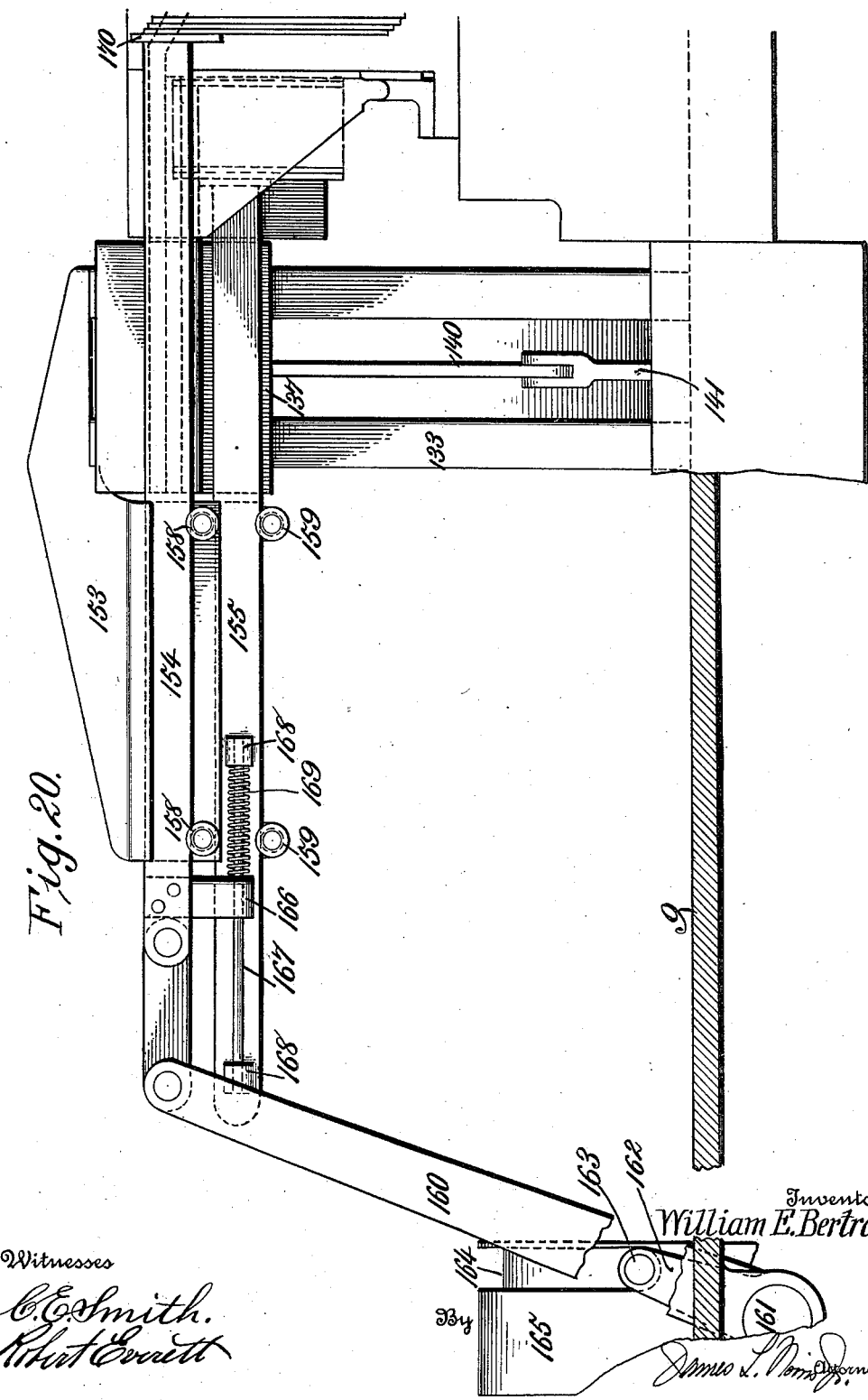
Figure 21:
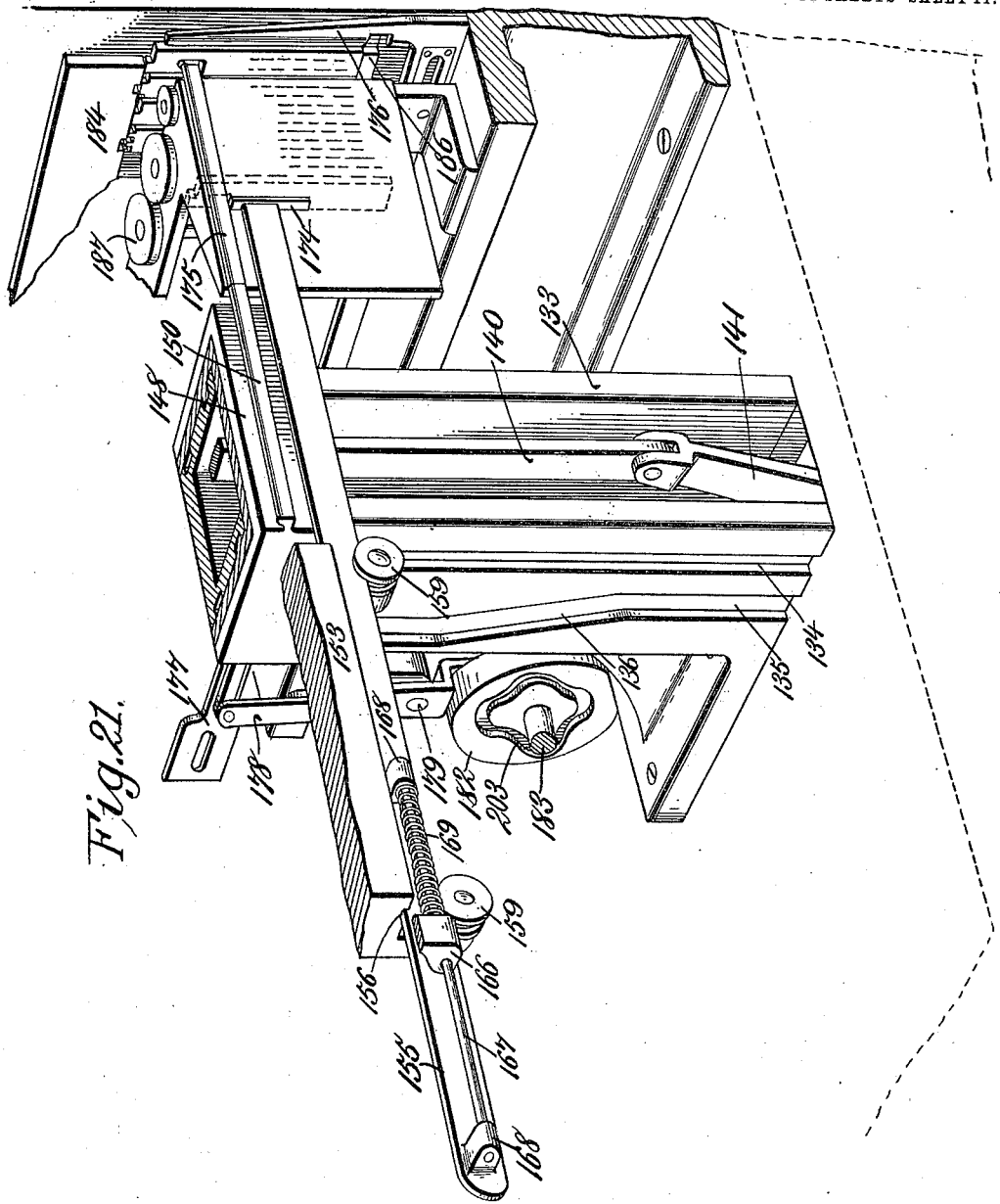
Figure 29:
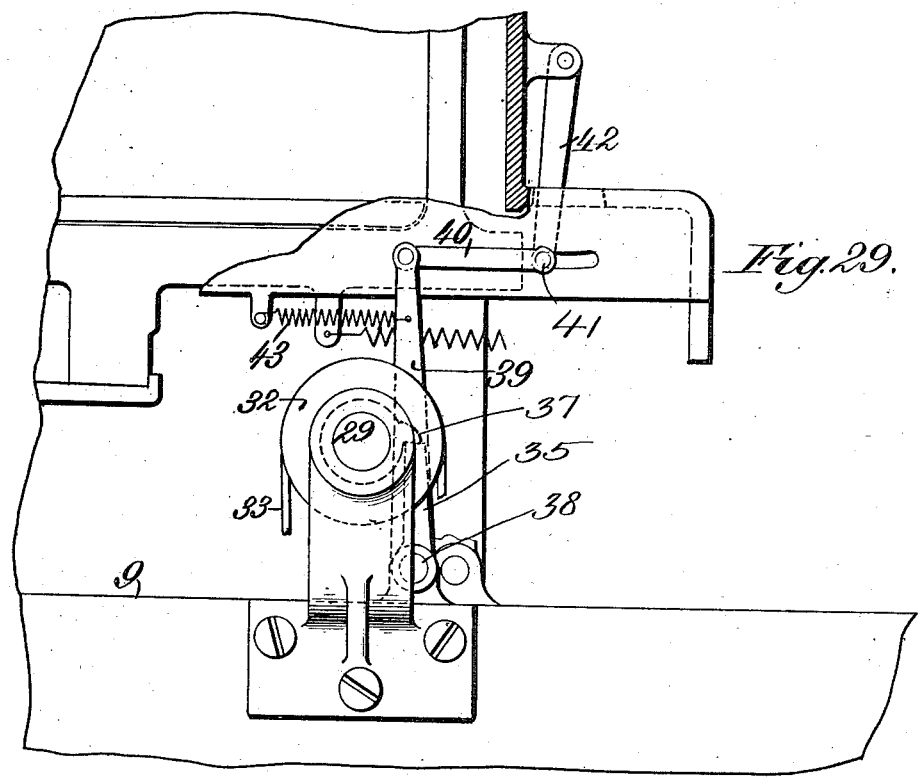
Figure 30:
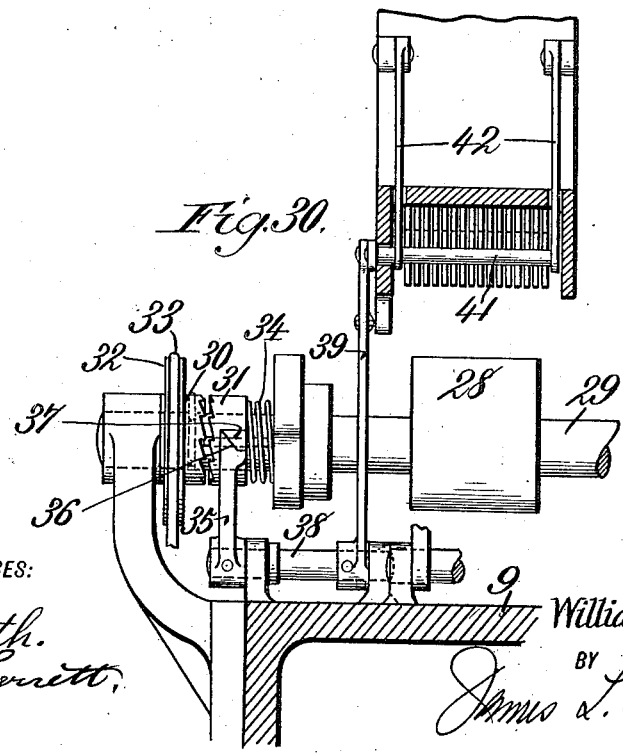

In the accompanying drawing:—Figure 1 is a perspective view of my improvements as applied to a monoline composing machine, certain elements, however, which form no part of the present invention being omitted; Fig. 2 represents a section though the right hand portion of the machine and showing the mechanism in elevation as viewed from the right in Fig. 1; Fig. 3 is a view similar to Fig. 2, the parts, however, being viewed from the left hand side of the machine as shown in Fig. 1; Fig. 4 is a top plan view of the parts shown in Fig. 1; Fig. 5 represents a section on the line 5—5 of Fig. 2 and showing the parts in normal position; Fig. 6 represents a section on the line 6—6 of Fig. 5 and looking in the direction of the arrows; Fig. 7 is a detail enlarged view of the composing box which is shown in plan, and the actuating and controlling bars which control the delivery of the matrices, the composing box in this view being shown in a position to receive the matrix bar; Fig. 8 is a view similar to Fig. 7 showing the composing box in position to transfer a matrix bar to the assembling bar; Fig. 9 is a perspective view of the composing box carriage and related parts as viewed from the rear; Fig. 10 represents a section on the line 10—10 of Fig. 9, the composing box being shown in normal or retracted position; Fig. 11 is a front elevation of the parts shown in Fig. 9, the composing box being shown in normal retracted position; Fig. 12 is a collective view of the parts of the composing box, the parts being shown in perspective; Fig. 13 is a perspective view of the bars which are actuated by the keyboard to deliver the matrices from the magazine and to arrest the composing box in a position to receive the delivered matrices; Fig. 14 represents a section on the line 14—14 of Fig. 13, the actuating bars being shown in position to coöperate with the detent levers corresponding to one font of matrices; Fig. 15 is a view similar to Fig. 14 showing the actuating bars in shifted position so as to coöperate with the remaining detent levers for the other font of matrices; Figs. 16 and 17 are detail sectional views of a portion of the magazine showing the improved device for assisting the discharge or descent of the matrix bar after it has been released; Fig. 18 represents a front elevation of the mechanism shown in Fig. 16; Fig. 19 is a detail perspective view of one of the matrix ejecting devices; Fig. 20 shows the elevator and transferring mechanism for the matrix bars and spacers, the parts being shown in operated position; Fig. 21 is a perspective view of the mechanism shown in Fig. 20, the transfer bars being shown in actuated position; Fig. 22 represents a section on the line 22—22 of Fig. 4 and illustrating the mechanism for lifting the matrices at the entrance to each magazine chamber, and also the means for yieldingly pressing the matrices toward the entrance of each magazine chamber; Fig. 23 is a sectional view illustrating on an enlarged scale one of the lifting devices and the pressing devices for introducing each matrix to its magazine chamber; Fig. 24 represents a front elevation of the mechanism shown in Fig. 23, illustrating the manner in which a line of matrices is fed transversely of the entrance to the respective magazine chambers, two of the matrices being shown in lifted position and in readiness to enter their respective magazine chambers; Fig. 25 is a detail view of the elevators which in this view are shown in their lowered position and in engagement with the matrix bars and spacers; Fig. 26 represents a section on the line 26—26 of Fig. 25; Fig. 27 is a collective view showing the two elevators in perspective and detached; Fig. 28 is a perspective view of one of the matrix bars; and Figs. 29 and 30 are detail views showing the clutch mechanism for setting into operation the restoring devices for the magazine pawls and the actuating bars which control them.

Similar parts are designated by the same reference characters in the several views.

The machine forming the present embodiment of my invention is adapted to handle multiple letter matrix bars which are similar to those disclosed in the patent aforesaid in that the bar 1 contains a series of characters 2 on one edge and a corresponding series of alining notches 3 on its opposite edge. The matrix bars, however, are materially different in this respect, that each bar has a hook 4 toward its upper edge, the hooks of all the matrices being of uniform length and located at the same distance from the bottom of the matrix bar and, moreover, the top of each matrix bar is provided with one or more distinguishing lugs 5, these lugs being placed differently on the matrix bars whereby during the distribution following each casting operation, the matrices will be returned correctly to their respective chambers and channels in the magazine. In the present instance, the machine is adapted to hold and operate with two fonts of matrices and in such cases, the distinguishing lugs will have a different form or location on each matrix bar in order that the matrix bars will be all returned to their proper places in the magazine. Each space bar 6, as shown in Fig. 25, is provided with a hook 7 which is located at a different elevation with respect to the hooks on the matrix bars when the space is supported by the lug 8 which rests on the alining bar, and the purpose of this will be hereinafter described.

In the accompanying drawing, I have shown a composing and casting machine of the monoline type as disclosed in the prior patent aforesaid. It will be understood, however, that certain features of the invention may be used in connection with composing and casting machines of a different type and, moreover, certain features of the invention may be used separately of one another although it is preferable to combine them in substantially the manner shown. It will be understood, of course, that modifications and changes may be made in the detail construction and in the relative arrangement of certain elements of the machine in order that the invention may be applied to the best advantage according to the circumstances of each particular case.

In the present instance, the machine embodies a main frame 9 which supports the magazine 10, the keyboard, the composing box, assembling devices, the elevator and distributing mechanism and associated parts. The magazine in the present instance is provided with two sets of channels, those of one set being designated 11 and those of the other set being designated 12, there being for example seven channels to contain matrices for one font and the remaining seven channels being adapted to contain matrices for the second font, the channels for the two sets preferably alternating. Two sets of distributing chambers 13 and 14 are also provided, the distributing chambers 13 serving to return the matrices of one font to the channels 11, while the distributing chambers 14 return the matrices of the second font to the channels 12. Each distributing chamber contains a rail 15 which slants downwardly toward the respective channel of the magazine, and this rail is adapted to coöperate with the hook of the corresponding matrix bar. Each channel of the magazine is provided with a delivery gate or pawl 16 which controls the discharge of the matrices, each pawl having an upwardly extending follower arm 17, a depending lug 18 with which a controlling detent 19 coöperates, and a spring 20 coöperates with each magazine gate or pawl and serves to retract it when released by the detent 19 whereby a matrix may be delivered from this particular channel of the magazine. One gate or pawl 16 and its corresponding detent 19 is provided for each channel of the magazine, there being consequently fourteen of these pawls and detents in the present instance, the detents for the two fonts being arranged preferably in alternating relation. These detents may all be pivoted to operate independently on a common shaft 21 which is supported by a stationary bracket 22, and each detent is provided with a depending arm 23 which when drawn forwardly serves to retract the detent and release its corresponding magazine gate or pawl.

The magazine gates or pawls may be restored to normal closed and locked position by means of an oscillator 24 which in the present instance is pivoted in bearings 25 secured to the main frame 9 and carries at its upper end a set of pawls 26 which are adapted to coöperate with the rear sides of the lugs 18 on the respective gates. This oscillator is provided with a roller 27 and said roller is adapted to be engaged by a cam 28 on an intermittently revolving shaft 29, the oscillator thereby receiving a to-and-fro movement which will serve to restore at each forward movement such magazine pawls as have been unlocked and retracted. This shaft 29 is supported in suitable bearings on the main frame of the machine and carries a pair of clutch members 30 and 31. The clutch member 30 is freely revoluble on the shaft 29 and may be driven continuously in any suitable manner such, for instance, as by a pulley 32 which receives power from a belt 33. The clutch member 31 is splined to the shaft 29 so that it may move axially thereon so as to engage and disengage the clutch member 30, and a spring 34 normally acts on the clutch member 31 to throw it into driving connection with the clutch member 30. The clutch member 31, however, is normally held out of engagement with the clutch member 30 by means of a clutch controlling arm 35 having an inclined shoulder 36 at its upper end which is adapted to engage a correspondingly shaped projection 37 on the clutch member 31. When, however, the arm 35 is retracted, it will release the clutch member 31 and the latter will be shifted by its spring 34 into driving connection with the continuously revolving clutch member 30, motion being thereby transmitted to the shaft 29 and the latter in turn will operate the oscillator to reset the magazine gates or pawls. When the shaft 29 has completed a revolution, the sloping shoulder 36 on the arm 35 will coöperate with the projection 37 on the clutch member 31 and the latter will be thereby retracted so as to disengage from the clutch member 30 and at the same time the motion of the shaft 29 will be arrested.

The clutch controlling arm 35 is actuated by a shaft 38 which is mounted in suitable bearings on the stationary frame 9 and carries a lever 39 the upper end of which is connected by a link 40 to a rod 41, the latter being suspended in rear of the magazine gates or pawls by means of a pair of links 42. The cross rod 41 is normally held in a position to be engaged by the magazine gates or pawls by a tension spring 43. Whenever a gate or pawl is released and moves rearwardly under the action of its spring 20, its rear end will strike the cross rod 41 and will move the latter rearwardly, overcoming the action of the spring 43 and rotating the shaft 38 so as to disengage the clutch controlling arm 35 from the projection 37. As soon as the magazine gate or pawl is restored by rotation of the cam shaft 29, the clutch controlling arm 35 will return to a position to disengage the clutch and hold it in such condition.

The detents for the magazine gates or pawls are released by a single set of actuating bars 44, there being seven used according to the present invention, this single set of actuating bars being operative from the usual single or common keyboard, and they are shiftable in order that they may be set into position to release and deliver matrices of one or another font as may be desirable. These bars in the present instance are guided at their forward ends by a comb block 45 which is fixed to the main frame 9, and the rear ends of these bars are shiftable laterally a distance corresponding to the distance between two adjacent detents 19 whereby such bars may be set to actuate one or another set of the depending arms 23 of the detents. For this purpose, the rear ends of the actuating bars are slidably fitted in a comb block 46, the latter being shiftable in a direction transverse to the length of the bars in a guide plate 47, the guide plate being fixed to the machine frame. Any suitable means may be provided for retaining the shiftable comb block 46 in one or another of its two positions in order that the bars 44 may actuate the detents 19 belonging to one or another font of matrices. In the present instance, I provide a pin 48 which is adapted for insertion into one or another of a pair of apertures 49 and 50 formed in the shiftable block 46 and the guide plate 47, respectively. The actuating bars 44 are provided with notches 51 to coöperate with one or another set of the detent actuating arms 23, and the rear ends of these bars are provided with upturned projections 52 which are adapted to be engaged by a reciprocatory resetting bar 53 which is placed above the bars and receives a to-and-fro motion from an arm 54. This arm 54 is connected to a rocking frame 55 which is pivoted on a shaft 56 supported in suitable bearings on the stationary frame 9 and the rocking frame 55 is provided with a roller 57 which is adapted to coöperate with and receive motion from the cam 28 on the intermittently turning and clutch-operated shaft 29. The resetting bar 53 is normally held in forward position to permit the bars 44 to operate freely by a tension spring 59. The forward ends of the bars 44 are provided with depending projections 60 for a purpose to be hereinafter described. Each bar 44 is also provided with a depending lug 61 adapted to coöperate with a corresponding bail rod 62, these bail rods being actuated from the keyboard in any suitable manner such, for instance, as that disclosed in the prior patent above mentioned. These actuating bars 44 perform three different functions. The initial part of the forward movement of each bar 44 serves to trip or release a traveling carriage containing the composing box. A further movement of the bar carries its forward end into a position to arrest the movement of the carriage containing the composing box whereby the latter is automatically positioned directly beneath the channel from which the selected matrix has been delivered, and the final portion of the forward movement of the bar causes it to unlock the detent which corresponds to the gate for the channel of the magazine containing the selected matrix whereby the matrix is delivered from the magazine channel directly into the composing box.

The composing box in the present instance is mounted on and shiftable with a carriage 63 which is movable in the stationary front plate 64 of the machine. This carriage may be guided in any suitable manner to permit it to operate freely in substantial alinement with the assembling bar 65. In the present instance, the carriage is guided to operate in the front plate by grooves 66 at the top and bottom which coöperate with corresponding ribs 67 formed in the top and bottom of the opening in the front plate, and in order to insure a free movement of the carriage, I preferably provide a pair of rollers 68 which ride in a recess 69 formed in a part of the front plate, the shafts 70 of the rollers riding in slots 71 formed in the carriage. The forward side of the carriage is provided with a pair of lugs 72. A pin 73 is non-rotatably fitted in such lugs and has a wing 74 loosely mounted thereon. This wing 74 forms the forward side of the composing box and it has a blade 75 attached thereto which serves to guide the matrix bar while entering the composing box and properly positions it therein. The lower end of the pin 73 has a guard 76 non-turnably attached thereto, and this guard is adapted to coöperate with the forward edge of each matrix bar and prevent its falling from the composing box while the wing 74 is opened to permit the transfer of the matrix bar from the composing box to the assembling bar. The wing 74 is automatically opened when the carriage reaches a position to transfer the matrix to the assembling bar. The means shown in the present instance for accomplishing such purpose consists of a slide 77 which is guided to operate in longitudinal grooves 78 formed in the carriage 63, and a compression spring 79 is interposed between the body portion of the carriage and the slide 77 and acts to normally hold the slide 77 in retracted position. This slide 77 carries a plate 80 which serves to close the right hand side of the composing box and it is inclined toward its upper end so as to guide the matrix bars while entering the composing box. This plate 80 is rigidly attached to a lug 81 formed on the slide 77. The slide 77 operates in the carriage behind the pivoted wing 74 of the composing box and between the stationary lugs 72, and it is provided with a pair of opposed lugs 82 which receive between them a roller 83 carried by an arm 84, the latter being formed as a part of the wing 74. At the left hand or discharge side of the composing box is arranged a movable retaining wing 85 which is capable of being deflected out of the path of the matrix while the latter is being discharged from the composing box. This wing is fitted in an opening 86 in the carriage and is turnable about a shaft 87, a spring 88 serving to normally hold the wing 85 in a position to assist the blade 75 on the movable wing 74. The detents 89 serve to retain the assembling line of matrices on the bar 65, each matrix as it is delivered from the composing box deflecting these detents in order that they may receive the matrix so delivered. The slide 77 on the traveling carriage is attached to a link 90 by means of the pivot 91, the other end of the link being attached to a bell-crank lever 92 which lever in turn is connected to a reciprocating bar 93, the latter being suitably guided to reciprocate on the main frame 9 and is provided toward its rear end with an upturned arm 94 carrying an operating roller or projection 95. The clutch-driven shaft 29 is also provided with a cam 96 to operate upon the roller 95 and thereby force the arm 94 forward. The bar 93, however, is normally held in retracted position by means of a compression spring 97 which may be interposed between the upturned arm 94 on the bar and one of the guide blocks 98 which is fixed to the stationary frame. The link 90 which is operated by the bell-crank lever 92 is formed on its under side with a stop 99 which is adapted to engage the upper portion of the forward end of one of the bars 44 when such bar is moved forward, whereby the traveling carriage will be stopped in its travel at a point to position the composing box directly beneath the magazine channel from which the selected matrix is delivered. In operating the machine to compose matrices of one font, this stop 99 is in use. When, however, another font of matrices is being selected and delivered from the magazine, I provide a supplemental stop which will position the composing box precisely beneath the channels containing the matrices of the other font. This supplemental stop consists in the present instance of a plunger 100 which operates immediately in front of the fixed stop 99 and it may be manually shifted into operative and inoperative position by means of a finger lever 101 which may be pivoted on a shaft 102 supported in suitable bearing lugs on the link 90. An expansion or friction spring 103 may be arranged between one of the bearing lugs and the finger lever 101 so as to frictionally retain the supplemental stop 100 either in operative or inoperative position. The traveling carriage is also provided with a shoulder or stop 104 and this stop serves to retain the carriage normally in retracted or initial position. In the present instance, this shoulder or stop 104 coöperates with a pawl 105 forming part of a rocking frame 106, the latter being pivoted on a shaft 107 supported in suitable bearing lugs 108 on the stationary frame, and the lower part of the frame 106 carries a roller 109 which lies immediately in front of the depending projections 61 on the forward ends of the bars 44. The frame 106 is normally held in such a position that the pawl 105 will coöperate with the shoulder or stop 104 on the carriage and thereby retain the latter in retracted position by a spring 110. The forward movement of any one of the bars 44, however, will cause the same to operate upon the roller 109 so as to tilt the frame 106 and thereby disengage the pawl 105 from the stop or shoulder 104, the carriage being thereby tripped or released and it will be shifted with the composing box toward the assembling line of matrices under the action of the spring 97 operating through the bar 93, bell-crank lever 92, link 90, slide 77 and spring 79. The forward movement of any one of the bars 44 also causes the upper portion of its forward end to engage either the stationary stop 99 or the adjustable supplemental stop 100 according to the font of matrices in use, the carriage being thereby arrested in its travel so as to position the composing box to correctly receive the selected matrix. As before stated, the final forward movement of each bar 44 opens the magazine gate or pawl so that the selected matrix may be delivered from the magazine. When the magazine pawl is retracted, it sets the cam shaft 29 into operation, and the cam 58 will thereupon set the resetting bar 53 into operation, thereby retracting the particular bar 44 that has been shifted forward. When the bar 44 is thus restored, its forward end will be disengaged from the stop 99 or 100 as the case may be, and the spring 97 will then complete the forward movement of the carriage and the composing box. The carriage upon completing its forward movement strikes the forward wall 111 of the front plate 64, the movement of the body portion of the carriage being thereby arrested, but the slide 77 will continue in its movement, the spring 97 overcoming the spring 79, and the lugs 82 will operate upon the roller 83 in a manner to swing the wing 74 into open position. The continued forward movement of the plate 80 and the slide 77 serves to eject the matrix from the composing box and while the matrix is being so ejected, the wing 85 is deflected, it immediately returning, however, to normal position after the passage of the matrix under the action of its spring 88. The traveling carriage and the composing box thereon is immediately returned to normal retracted position after the discharge of the matrix bar through the link 90, bell-crank lever 92 and bar 93, the roller 95 on the bar being operated by the cam 96 on the cam shaft 29.

From the foregoing description, it will be understood that the carriage can be adjusted so that the composing box will be positioned directly beneath the channels containing the matrices for one or another font merely by manual adjustment of the finger lever 101. It will be also understood that the spring 79 which is interposed between the body portion of the traveling carriage and the slide 77 normally serves to retain the wing 74 of the composing box in closed position with the ejecting plate 80 retracted so as to permit the matrix to drop freely into the box.

The present invention also provides simple and improved devices for assisting the discharge of the selected matrices from the respective channels of the magazine. These devices each embody a bar 112 having a slotted blade 113 which is adapted to operate in a guiding slot 114 formed in the upper portion of the housing 115 of the magazine. For convenience, the guiding blades 113 of all of these devices are arranged in alinement, and rods 116 may extend through the housing and operate in the slots of the guiding blades 113. A spring 117 is also provided for each matrix discharging bar, its upper end being preferably seated in the housing of the magazine while its lower end rests upon a seat 118. Each matrix delivery device also embodies a plunger 119 which normally rests upon the top of the foremost matrix in the respective magazine channel. All of the matrix discharging devices may be reset from a common device which in turn may be actuated from the cam shaft 29. The resetting device shown in the present instance consists of a rock shaft 120 which may be suitably journaled in the magazine housing and is provided with a pair of crank arms 121 which carry a cross arm 122, and this cross arm may also be fitted with a roller 123. The roller 123 extends across the several channels of the magazine and is adapted to bear against an abutment surface 124ᵃ on each matrix discharging device when the shaft 120 is rotated in one direction. Normally, however, the roller 123 will occupy a depressed position as shown in full lines in Fig. 16, it being then clear of the abutment surfaces 124ᵃ of the several matrix discharging devices so that any one of them may descend under the action of its spring and accelerate the discharging movement of the foremost matrix. The shaft 120 may be conveniently operated by a crank 124, this crank in turn being connected to a link 125 and the lower end of the link is connected to one arm of a bell-crank lever 126, the other arm of the bell-crank lever being connected by a link 127 to a rocking frame 128. This frame 128 is pivoted on a shaft 129 supported by suitable bearing lugs on the main frame 9 of the machine and it carries on its upper end an operating roller 130. This roller 130 is arranged to coöperate with a cam 131 carried by the cam shaft 29 and it is held in engagement with such roller by a spring 132 which may be conveniently attached to the crank arm 124. All of the matrix discharging devices are normally resting upon the tops of the foremost matrices in the respective magazine channels so that when the magazine gate or pawl for any one of these channels is retracted, the matrix delivery device will immediately operate under the action of its spring 117, the matrix being thereby discharged from the respective channel of the magazine with certainty and with an accelerating movement. Each matrix discharging device after so operating is automatically reset so as to be in a position to engage the top of the next matrix bar by the cam shaft 29 acting through the cam 131. After the matrices have been assembled and alined and the cast has been made, they are returned together with the spacers to the respective channels of the magazine and to the space box.

The present invention provides a simple and improved mechanism for elevating the matrices and spacers and for properly distributing them. In the present instance, a standard 133 is mounted rigidly on the stationary machine frame and is provided on its opposite sides with a pair of straight perpendicular guide grooves 134 and also with a pair of guide grooves 135 each of which has an offset or inclined portion 136. The elevator according to the present invention operates vertically on the standard 133 and it is composed of two sections. One section 137 is yoke-shaped so as to fit the front and two sides of the standard 133, and it has a pair of opposed ribs 138 which operate in the rectilinear guiding grooves 134 in the standard and it has a lug 139 within it which is pivotally connected to a link 140 which link in turn is connected to an operating lever 141. This operating lever is mounted on a shaft 142 supported in suitable bearing lugs on the under side of the main frame 9, and its rear end carries a roller or projection 143 which follows a cam groove 144 formed in a cam 145, the cam being fixed to and turnable with the cam shaft 146 mounted in appropriate bearings on the machine frame. The forward side of the elevator section 137 is provided with a rail 147 which is arranged at such an elevation as to receive the hooks 7 on the spacers as the latter are removed from the casting point together with the other matrices forming the line. The section 137 of the elevator also carries a relatively shiftable elevator section 148, the opposite sides of the section 137 being provided with grooves 149 to receive and guide the sides of the section 148, and the front of the section 148 is provided with a rail 150 which when the elevator is in lowered position is located at a proper distance beneath the rail 147 of the section 137 and is adapted to receive the hooks 4 of the matrix bars. The elevator is lifted from the shaft 146 and during the ascending movement, the elevator section 148 which carries the matrix bars is shifted relatively to the section 137 so as to carry the matrices out of the path of the spacers in order that the spacers and matrices may be distributed respectively to the space box and to the magazine. This relative shifting movement between the sections 137 and 148 is effected by a pair of rollers 151 which are attached to the sides of the elevator section 148 and operate in the cam groove 136 of the standard 133, the sides of the section 137 being provided with clearance slots 152 to permit the passage of the roller shafts. The upper end of the standard 133 supports a bracket 153, and this bracket forms a sliding support for a pair of reciprocatory transfer bars 154 and 155, these bars preferably operating in grooves 156 and 157 at their upper edges and resting upon anti-friction rollers 158 and 159. The transfer bar 154 is actuated from the shaft 146 through the medium of a lever 160 which is mounted on a shaft 161 suitably journaled in the machine frame and carrying at its opposite end an arm 162 equipped with a roller or projection 163, this roller or projection coöperating with a cam groove 164 formed in a cam 165 fixed to the cam shaft 146. The transfer bar 155 is operated from the bar 154, these bars being capable of a relative movement and, moreover, the bar 155 which serves to remove the matrix bars from the elevator continues to move forward after the bar 154 has completed its forward movement. The operating connection between the bars 154 and 155 consists in the present instance of a lug 166 which is attached to the bar 154 and operates on a rail 167 supported on lugs 168 forming part of the bar 155, a compression spring 169 being interposed between the forward side of the lug 166 and one of the lugs 168 on the bar 155. The forward end of the transfer bar 154 carries a follower plate 170 which is adapted to engage such spacers as may rest on the rail 147 while the elevator is in lifted position, and on the forward movement of the transfer bar 154, the spacers will be transferred from the rail 147 to a stationary rail 171, and this stationary rail in turn transfers the spacers to a sloping rail 172 in the space box 173, the spacers being stored in the space box and in readiness for use. When the transfer bar 154 is moved forward in this manner, the transfer bar 155 is also carried forward through the medium of the lug 166 and the spring 167. The forward end of the transfer bar 155 carries a follower plate 174 which is adapted to engage the line of matrices resting on the rail 150 of the elevator section 148. The matrices are thereby removed from the rail 150 and transferred to a stationary rail 175, and the follower plate 174 on the forward end of the transfer bar 155 will bear upon the line of matrices hanging on the rail 175 with a yielding pressure. In this manner, the line of matrices is fed successively to a reciprocatory shuffler 176 the forward edge of which is tapered or beveled so as to allow for the different thicknesses of the matrix bars, and this shuffler is carried by a reciprocatory bar 177, such bar receiving reciprocatory motion from a lever 178 which is mounted on a stationary pivot 179 and carries a roller or projection 180 which operates in a cam groove 181 formed in a cam 182, the latter being fixed to a continuously revolving shaft 183.

A combination rail 184 extends across the rear of the magazine distributing chambers 13 and 14, it being provided at the entrance to each chamber with one or more distinguishing notches 185 corresponding in size and location to the distinguishing lugs 5 on the respective matrix bars. A smooth rail 186 extends across the bottom of the magazine distributing chambers and normally forms an abutment to prevent the lower ends of the matrix bars from entering the distributing chambers except when the appropriate matrix bars are in alinement with the entrances to their respective chambers so that they can be lifted owing to the entrance of their distinguishing lugs 5 into the corresponding distinguishing notches 185 in the combination plate. The shuffler 176 successively engages the edge of the adjacent or rearmost matrix in the line of matrices resting on the rail 175 and feeds the line of matrices edgewise along the rail 186 and in rear of the line of distributing chambers, the line of matrices being advanced in this manner and by a step-by-step motion, each step being equal to the width of each matrix so that the matrices are brought into registration with the entrances to the magazine chambers at each operation of the shuffler. The matrices, moreover, are yieldingly pressed toward the distributing chambers by upper and lower rollers 187 carried by shafts 188, these shafts being mounted to operate freely in slots formed in a bracket 189, and springs 190 operate on the shafts 188 to press the rollers 187 against the line of matrices.

The bottom rail 186 is provided in rear of each magazine chamber with a slot 191 and each slot is provided with a lifting finger 192 which moves upwardly after the shuffler 176 has completed each movement. Each lifting finger 192 is mounted loosely on a rock shaft 193 and this rock shaft is provided with an arm 194 for each lifting finger. Each arm 194 is fixed to the rock shaft 193 and operates upon the lifting finger through the yielding action of a compression spring 195, this compression spring preferably surrounding a screw 196 which serves as a guide and it bears on an arm 197 forming part of the lifting finger. The shaft 193 is rocked at appropriate intervals through the medium of an arm 198, this arm being connected in turn to a link 199 and such link is connected to a lever 200 which is mounted on a stationary pivot 201 and carries a roller or projection 202 which follows a cam groove 203 formed in the reverse side of the cam 182.

In operation, the line of matrices resting on the rail 175 is fed edgewise along the rail 186 and beneath the combination rail 184 by the reciprocatory movements of the shuffler 176. After each feeding movement of the shuffler 176, the shaft 193 is rocked in a direction to lift the fingers 192. During the rocking movement of the shaft 193 such matrix bars as are in rear of their respective distributing chambers will be capable of a lifting movement, the combination lugs 5 thereon being capable of entering the distinguishing notches 185 in the combination plate, and the lifting movement of the corresponding finger 192 will cause the matrix to be lifted above the bottom rail 186 and the hook 4 on the matrix bar will be lifted upon the rail 5 in the distributing channel. The matrix bar will thereby enter the distributing channel and will descend the rail 15 and enter its respective magazine channel. The matrix bars, however, which are not in rear of the proper distributing channels of the magazine will not be lifted by the lifting fingers owing to the inability of the distinguishing lugs thereon to enter the distinguishing notches in the combination plate, such matrices consequently remaining upon the bottom rail 186 and the corresponding lifting finger will remain inactive due to the yielding of the springs 195.

What I claim is:

1. In a monoline composing machine the combination of a magazine adapted to contain matrices of a plurality of fonts, delivery gates, detents individual to the matrices of each font and a set of longitudinally reciprocatory key-board actuated bars shiftable laterally and angularly with respect to their lengths into operative relation with the detents for matrices of one or another font.

2. In a monoline composing machine the combination of a magazine provided with channels to contain matrices of a plurality of fonts, a delivery gate and detent for each magazine channel, a set of longitudinally reciprocable and angularly shiftable actuating bars for the detents, and means for shifting the operative portions of said bars laterally to bring such portions into coöperative relation with the detents of one or another font.

3. In a monoline composing machine the combination of a magazine having a plurality of sets of channels each set to contain matrices of a different font, a set of delivery gates and detents for each set of magazine channels, and a set of longitudinally reciprocable and angularly shiftable actuating bars, the operative portions of which are shiftable transversely whereby they may be positioned to coöperate with the detents of one or another set.

4. In a monoline composing machine the combination of a magazine provided with channels to contain matrices, spring actuated devices for assisting the discharge of the matrices from each magazine channel, said devices being operative independently of one another and resting with a spring pressure upon the top of the foremost matrix bar in each magazine channel, and restoring means common to all of said devices.

5. In a monoline composing machine the combination of a magazine provided with channels to contain matrix bars, a set of matrix-discharge devices one individual to each magazine channel, springs for causing each discharge device to rest with a spring pressure upon the top of the foremost matrix bar in each magazine channel, and a supporting device common to all of the matrix-discharge devices.

6. In a monoline composing machine the combination of a magazine provided with channels to contain matrix bars, a set of individually operative discharging devices adapted to operate in the housing of the magazine and provided with springs for causing the devices to operate with a spring pressure upon the top of the foremost matrix bar in each magazine channel, a power shaft and means operative by the power shaft and common to all of the matrix-discharging devices for returning the latter to initial position after the discharge of each matrix bar.

7. In a monoline composing machine the combination of a magazine having channels to contain the matrices, a discharge gate for each magazine channel, matrix-discharging devices mounted in the magazine housing and each having a spring for pressing it into engagement with the top of the foremost matrix in each magazine channel, a re-setting device common to all of the matrix-discharging devices, a power shaft, a mechanism releasable by the opening movement of each magazine gate for setting the power shaft into motion and means on the power shaft for operating the re-setting device for the matrix-discharging devices.

8. In a monoline composing machine the combination with a magazine adapted to contain matrices, a set of delivery gates therefor, a set of matrix-discharging devices mounted in the magazine housing containing springs for yieldingly pressing them into engagement with the tops of the foremost matrices in the magazine, a re-setting device common to all of the matrix-discharging devices, a clutch-operated power shaft, means on the power shaft for restoring the delivery gates to normally closed position and mechanism releasable by the delivery gates for setting the clutch-operated shaft into motion.

9. In a monoline composing machine, the combination of a magazine provided with matrix-containing channels, means for selecting and delivering matrices from the different channels of the magazine, an assembling rail, a traveling composing box having means for positioning it directly beneath the particular channels of the magazine from which the matrices are delivered, said composing box being movable toward and from the assembling rail and in alinement therewith, and means for shifting the composing box to transfer a matrix from the composing box to the assembling rail at each operation of the composing box.

10. In a monoline composing machine, the combination of a magazine provided with matrix channels, means for selecting and delivering matrices from the respective magazine channels, a traveling composing box having means under the control of the matrix selecting means for positioning it to receive matrices from the different magazine channels, an assembling rail arranged in alinement with the path of movement of the composing box, and means for opening the composing box and transferring a matrix therefrom to the assembling rail at each operation of the composing box.

11. In a monoline composing machine, the combination of a magazine provided with channels to contain matrices and means for selecting and delivering matrices from the respective channels of the magazine, of a traveling composing box having means for positioning it directly beneath the particular channel of the magazine from which the matrix is delivered, an assembling rail arranged in the line of movement of the composing box, and an ejector carried by the composing box and operative to transfer each matrix successively to the assembling rail.

12. In a monoline composing machine, the combination of a magazine provided with matrix-containing channels, means for selecting and delivering matrices from the different magazine channels, an assembling rail, a traveling composing box movable toward and from the assembling rail in alinement therewith and having means for positioning it directly beneath the particular channel of the magazine from which the matrix is delivered, and means for opening the composing box and transferring a matrix therefrom to the assembling rail as the traveling carriage approaches the assembling rail.

13. In a composing machine the combination of a magazine provided with channels to contain matrices, means for selecting and delivering matrices from the respective channels of the magazine, a traveling composing box adapted to be positioned directly beneath each channel of the magazine and controllable by the matrix-selecting means, and an assembling rail arranged to receive the matrices from the composing box.

14. In a composing machine the combination of a magazine provided with channels containing matrices, means for selecting and delivering matrices from the respective channels, and a composing box shiftable transversely beneath the channels of the magazine and having means normally tending to shift it and also means for automatically arresting its movement beneath the proper channel under the control of the selecting means.

15. In a composing machine the combination of a magazine having channels to contain matrices, means for selecting and delivering matrices from the respective channels, a traveling composing box adapted to shift into a position directly beneath any one of the channels of the magazine and releasable and controllable by the matrix-selecting means, an assembling rail, and means for transferring the matrices from the composing box to the assembling rail.

16. In a composing machine the combination of a magazine having channels to contain matrices, means for selecting and delivering matrices from the several channels of the magazine and including reciprocatory bars and a traveling carriage having means for normally holding it in initial retracted position, such holding means being releasable automatically by any one of the said bars when actuated, and the carriage also having means for arresting its movement by the actuated bar to occupy a position directly beneath the corresponding magazine channel.

17. In a composing machine the combination of a magazine having channels to contain matrices, means for selecting and delivering matrices therefrom and a traveling carriage releasable automatically by the matrix-selecting means and adapted to be retained in a position directly beneath the magazine channel containing the selected matrix, the carriage also having means for imparting a further movement thereto to eject the matrix therefrom.

18. In a composing machine the combination of a magazine having channels to contain matrices, means for selecting and delivering matrices from the several channels, an assembling member, a traveling carriage, means for normally retaining the carriage in retracted position and releasable by the matrix-selecting means, the carraige also having means for arresting its movement under the control of the selecting means to occupy a position directly beneath the magazine channel containing the selected matrix and means for imparting a further movement to the composing box on the carriage to transfer a matrix thereon to the assembling member.

19. In a composing machine the combination of a magazine having a plurality of channels to contain matrices, means for selecting and delivering matrices from the magazine, a traveling carriage having a composing box thereon, means for normally retaining the carriage and composing box in retracted position and releasable automatically by the matrix selecting means, the carriage also having means for positioning the composing box directly beneath the particular channel of the magazine containing the selected matrix, means for imparting a further movement to the carriage to bring the composing box thereon into coöperative relation with the assembling member and means for opening the composing box and ejecting the matrix therefrom.

20. In a composing machine the combination of a magazine having a plurality of matrix-containing channels, means for selecting and delivering matrices therefrom, a carriage shiftable in a direction transverse to the length of the magazine channels and supporting a composing box, means normally operating to shift the carriage, a detent for normally retaining the carriage in initial position and means controlled by a part of the selecting means for arresting the carriage at a point to position the composing box directly beneath the particular channel from which the matrix is to be delivered.

21. In a composing machine the combination of a magazine having channels to contain matrices, means for selecting and delivering matrices from the several channels and including reciprocatory bars, a carriage shiftable in a direction transverse to the direction of movement of said bars and supporting a traveling composing box, means for producing a traversing movement of the carriage and composing box, a detent releasable by said bars and serving to normally retain the carriage in initial position, the carriage having a part to coöperate with any one of said bars when actuated whereby the composing box will be positioned directly beneath the corresponding magazine channel, and means for restoring the carriage and composing box to initial position.

22. In a composing machine the combination of a magazine having a plurality of channels to contain matrices, means for selecting and delivering matrices from the several channels and including reciprocatory bars, a carriage shiftable transverse to the direction of movement of said bars and having a part adapted to be engaged by any one of said bars when in actuated position, a composing box mounted on and shiftable with the carriage, means for opening the composing box to eject the matrix therefrom when the carriage reaches the limit of its movement, means for producing a traversing movement of the carriage and a detent controlled by said bars for normally retaining the carriage in initial position.

23. In a composing machine the combination of a magazine having channels to contain matrices, means for selecting and delivering matrices therefrom, a traveling carriage carrying a composing box, means on the carriage and movable relatively thereto for opening the composing box, means connected to the opening means for the composing box for imparting a traversing movement to the carriage, and a device releasable by the matrix-selecting means for normally retaining the carriage in initial position.

24. In a composing machine, the combination of a magazine having a plurality of matrix channels, means for selecting and delivering matrices from the several channels, a traveling carriage shiftable transversely of said channels and carrying a composing box adapted to be positioned directly beneath the particular channel from which the selected matrix is delivered, a slide carried by and shiftable relatively to the carriage and embodying an ejector and also means for opening the composing box, means connected to said slide for imparting a traversing movement to the carriage, and a detent releasable by the matrix-selecting means for normally retaining the carriage in retracted position.

25. In a composing machine the combination of a magazine having a plurality of matrix-containing channels, means for selecting and delivering matrices therefrom, including a set of reciprocatory members, a traveling carriage supporting a composing box, said carriage having a part adapted to be engaged by one of said members when actuated to position the composing box directly beneath the corresponding magazine channel, a power shaft, and a re-setting member operative thereby to restore said reciprocatory members to initial position whereby the carriage will be released and may move into matrix-discharging position.

26. In a composing machine the combination of a magazine having a plurality of sets of matrix containing channels, each set adapted to contain matrices of one font, means for selecting and delivering matrices from one or another set of channels, a traveling carriage supporting a composing box, the carriage being controllable by the matrix-selecting means whereby the composing box will be positioned directly beneath the magazine channel containing the selected matrix, and means whereby the position of the carriage may be altered to arrest the composing box directly beneath one or another set of the magazine channels.

27. In a composing machine the combination of a magazine having a plurality of sets of matrix channels, each set adapted to contain matrices of one font, means for selecting and delivering matrices from one or another set of channels as desired, a traveling carriage supporting a composing box and means on the carriage coöperative with the matrix-selecting means and adjustable to cause the composing box to be positioned directly beneath one or another of the sets of channels of the magazine.

28. In a composing machine a reciprocatory elevator comprising members which are relatively shiftable transversely of the direction of reciprocation of the elevator, one member having a rail to coöperate with and support matrices and the other member having a rail to coöperate with and support spacers.

29. In a composing machine, an elevator embodying a pair of members bodily reciprocable in one direction, one of the members being shiftable in a direction transverse to the movement first mentioned, the members of the elevator having rails to coöperate with and support matrix bars and spacers, respectively.

30. In a composing machine, an elevator comprising a standard, a pair of elevator members bodily reciprocable on said standard, one of the members of the elevator being shiftable relative to the other member in a direction transverse to the movement first mentioned, the members of the elevator having individual means for supporting matrices and spacers.

31. In a composing machine an elevator mechanism comprising a vertical standard and a pair of elevator members bodily movable vertically thereon, one of the elevator members being mounted to shift transversely on the other member and having means for shifting it in such direction while both members are being elevated, and means on the elevator members for supporting matrix bars and spacers respectively.

32. In a composing machine, elevator mechanism comprising a standard, a pair of elevator members movable vertically on the standard and having means for supporting matrices and spacers respectively, one of said members having means for shifting it horizontally during the elevating movement, a rail to receive the matrices, means to receive the spacers, and transfer means for removing the matrices and spacers from the respective members of the elevator.

33. In a composng machine the combination of a magazine having matrix-distributing chambers, a combination rail extending across the tops of the entrances to the distributing chambers, means for feeding a line of matrix bars edgewise along a path below the combination rail and devices for lifting the matrix bars into coöperative relation with the combination rail.

34. In a composing machine the combination of a magazine having a set of distributing chambers, a combination rail extending across the entrances to said chambers, a reciprocatory device for advancing a line of matrix bars along a path below the combination rail, means for yieldably pressing the matrix bars toward the entrances to the distributing chambers and devices for lifting the matrix bars toward the combination rail.

35. In a composing machine a distributing mechanism embodying a combination rail extending across the entrances to the distributing chambers of the magazine, means for yieldably pressing a line of matrix bars toward the entrances to the said chambers, a reciprocatory shuffler for advancing a line of matrix bars along the combination rail, and a set of lifting fingers coöperative with the line of matrices and adapted to move the same into engagement with the combination rail.

36. In a monoline composing machine a distributing mechanism embodying means for advancing a row of matrix bars in flatwise relation, a device reciprocable in a direction transverse to said line of matrix bars and operative to shift them successively and edgewise to form a line at the entrance to the distributing chambers of the magazine, a combination rail extending across the tops of the entrances to said chambers, a matrix supporting rail arranged beneath the combination rail, means tending to press the matrices into the several distributing chambers, and devices for lifting the matrices from said supporting rail and into engagement with the combination rail.

37. In a monoline composing machine, the combination of a magazine having a set of distributing chambers, a combination rail extending transversely with respect to said chambers, a matrix supporting rail opposed to said combination rail, a device for advancing a line of matrix bars edgewise along the supporting rail and beneath the combination rail, means acting upon the matrices and tending to force them into the distributing chambers, and a set of lifting devices arranged adjacent to the entrances to the distributing chambers and operative upon the matrix bars to lift them from the supporting rail and into engagement with the combination rail.

38. In a composing machine, the combination of a magazine having a set of distributing chambers, a combination rail extending across the entrances to said chambers, a matrix supporting rail extending across the bottoms to said entrances and having a retaining ledge thereon, means acting upon the matrices and normally tending to force them into the distributing chambers, and a set of yieldably operated devices for lifting the matrices toward the combination rail and clear of the retaining ledge on the supporting rail.

In testimony whereof I have hereunto set my hand in presence of two subscribing witnesses.

WILLIAM ERNEST BERTRAM.

Witnesses:
CLARENCE A. BATEMAN,
CHAS. S. HYER.

Copies of this patent may be obtained for five cents each, by addressing the "Commissioner of Patents, Washington, D. C."